(12) United States Patent
Rossi (10) Patent No.: US 8,223,974 B2
(45) Date of Patent: Jul. 17, 2012

(54) SELF-HEALING ENCRYPTION KEYS

(75) Inventor: Angelo Rossi, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 455 days.

(21) Appl. No.: 12/533,734

(22) Filed: Jul. 31, 2009

(65) Prior Publication Data

US 2011/0026715 A1 Feb. 3, 2011

(51) Int. Cl.
*H04L 9/08* (2006.01)
*H04L 9/00* (2006.01)
(52) U.S. Cl. .......................... 380/278; 380/279; 380/47
(58) Field of Classification Search .................. 380/47, 380/278, 279
See application file for complete search history.

(56) References Cited

U.S. PATENT DOCUMENTS

| 7,907,733 | B2 * | 3/2011 | Cho et al. ....................... 380/273 |
| 2004/0017916 | A1 * | 1/2004 | Staddon et al. ................. 380/277 |
| 2005/0018842 | A1 * | 1/2005 | Fu et al. ........................... 380/44 |
| 2007/0140481 | A1 * | 6/2007 | Parameswaran Rajamma ........................ 380/37 |
| 2008/0085003 | A1 * | 4/2008 | Waisbard ....................... 380/277 |
| 2008/0095375 | A1 | 4/2008 | Tateoka et al. |
| 2010/0251056 | A1 * | 9/2010 | Dinan ............................ 714/749 |

FOREIGN PATENT DOCUMENTS

WO  2005/109735 A1  11/2005

OTHER PUBLICATIONS

Jessica Staddon et al., Self-Healing Key Distribution with Revocation. SP '02 Proceedings of the 2002 IEEE Symposium on Security and Privacy IEEE Computer Society Washington, DC, USA © 2002. pp. 1-17.*

Dutta, R. ; Mukhopadhyay, S. ; Emmanuel, S. ; Syst. & Security Dept., Inst. for Infocomm Res., Singapore Modeling & Simulation, 2008. AICMS 08. Second Asia International Conference on May 2008. pp. 1-6.*

Yixin Jian et al., Self-healing group key distribution with time-limited node revocation for wireless sensor networks. Department of Computer Science and Technology, Tsinghua University, Beijing 100084, China Department of Electrical and Computer Engineering, University of Waterloo, Canada Available online Jun. 23, 2006. pp. 1-10.*

(Continued)

*Primary Examiner* — Kambiz Zand
*Assistant Examiner* — Aubrey Wyszynski
(74) *Attorney, Agent, or Firm* — David J Rahmer; Ericsson Canada Inc.

(57) ABSTRACT

A method and nodes provide self-healing encryption keys from a server to a client. Forward keys and backward keys are generated at the server. The server sends to the client a pair comprising a forward key for a first instant and a backward key for a later instant, the first and later instants being separated by a self-healing period. The client calculates a backward key for the first instant by processing the received backward key for the later instant. The server updates the keys to the client. If the client misses an update, it processes the first forward key to obtain a next one. If the client misses an updated backward key within the self-healing period, it uses the already processed backward key. If the client misses a later backward key, it sends a feedback to the server, responsive to which the server adjusts the self-healing period.

24 Claims, 7 Drawing Sheets

OTHER PUBLICATIONS

Zhu, Sencun, et al., "Scalable Group Rekeying for Secure Multicast: A Survey," Springer-Verlag Berlin Heidelberg 2003, pp. 1-10.

Shi, Minghui, et al., "Self-Healing Group-Wise Key Distribution Schemes with Time-Limited Node Revocation for Wireless Sensor Networks," IEEE Wireless Communications, Oct. 2007, pp. 38-46.

Zhu, Sencun, et al., Adding Reliable and Self-healing Key Distribution to the Subset Difference Group Rekeying Method for Secure Multicast, Springer-Verlag Berlin Heidelberg 2003, pp. 107-118.

Jiang, Yixin et al., Self-healing group key distribution with time-limited node revocation for wireless sensor networks, Elsevier, ScienceDirect, Jun. 23, 2006, pp. 14-23.

Du, Chunlai et al., Anti-Collusive Self-Healing Key Distribution Scheme with Revocation Capability, Information Technology Journal 2009, 2009 Asian Network for Scientific Information, Downloaded Apr. 23, 2009, pp. 1-6.

Naor, Dalit et al., Revocation and Tracing Schemes for Stateless Receivers, Feb. 24, 2001, pp. 1-33.

Wallner, D. et al., Key Management for Multicast: Issues and Architectures, Network Working Group, RFC 2627, Jun. 1999, pp. 1-23.

Staddon, Jessica et al., Self-Healing Key Distribution with Revocation, Proceedings of the 2002 IEEE Symposium on Security and Privacy, 2002 IEEE, pp. 1-17.

Wei, Shih-Yi, Self-Healing Schemes and Theorems (1), Downloaded Apr. 23, 2009, pp. 1-21.

Yixin Jiang et al., Self-healing group key distribution with time-limited node revocation for wireless sensor networks, Elsevier, Science Direct, vol. 5, No. 1, Jan. 1, 2007, pp. 14-23.

Xukai Zou et al., A robust and stateless self-healing group key management scheme, Communication Technology, 2006, ICCT'06, Nov. 1, 2006, pp. 1-4.

Biming Tian et al., An efficient self-healing key distribution scheme, New Technologies, Mobility and Security, 2008, NTMS'08, Nov. 5, 2008, pp. 1-4.

Sara Miner More et al., Sliding-window self-healing key distribution, Proceedings of the ACM workshop on survivable and self-regenerative systems, SSRS'03, Oct. 31, 2003, pp. 82-90.

PCT Search Report from corresponding application PCT/IB2010/053288, Oct. 28, 2010.

\* cited by examiner

SELF-HEALING ENCRYPTION KEYS

TECHNICAL FIELD

The present invention relates generally to the field of communications and, more specifically, to a method, a server node, and a client node for providing and receiving self-healing encryption keys.

BACKGROUND

Communication between servers and clients may often carry sensitive information or may carry content provided to the clients for a fee. A situational example of sensitive information may comprise a bank server providing banking information to an account holder client and the client entering transactions on a bank account. An example of content paid by a client may comprise a pay-TV content provided by an Internet Protocol TV (IPTV) server to an IPTV terminal. Whether the information exchanged between a server and a client is sensitive or has a commercial value, it is customary to encrypt the information in order to prevent eavesdropping by third parties.

Figure 1:
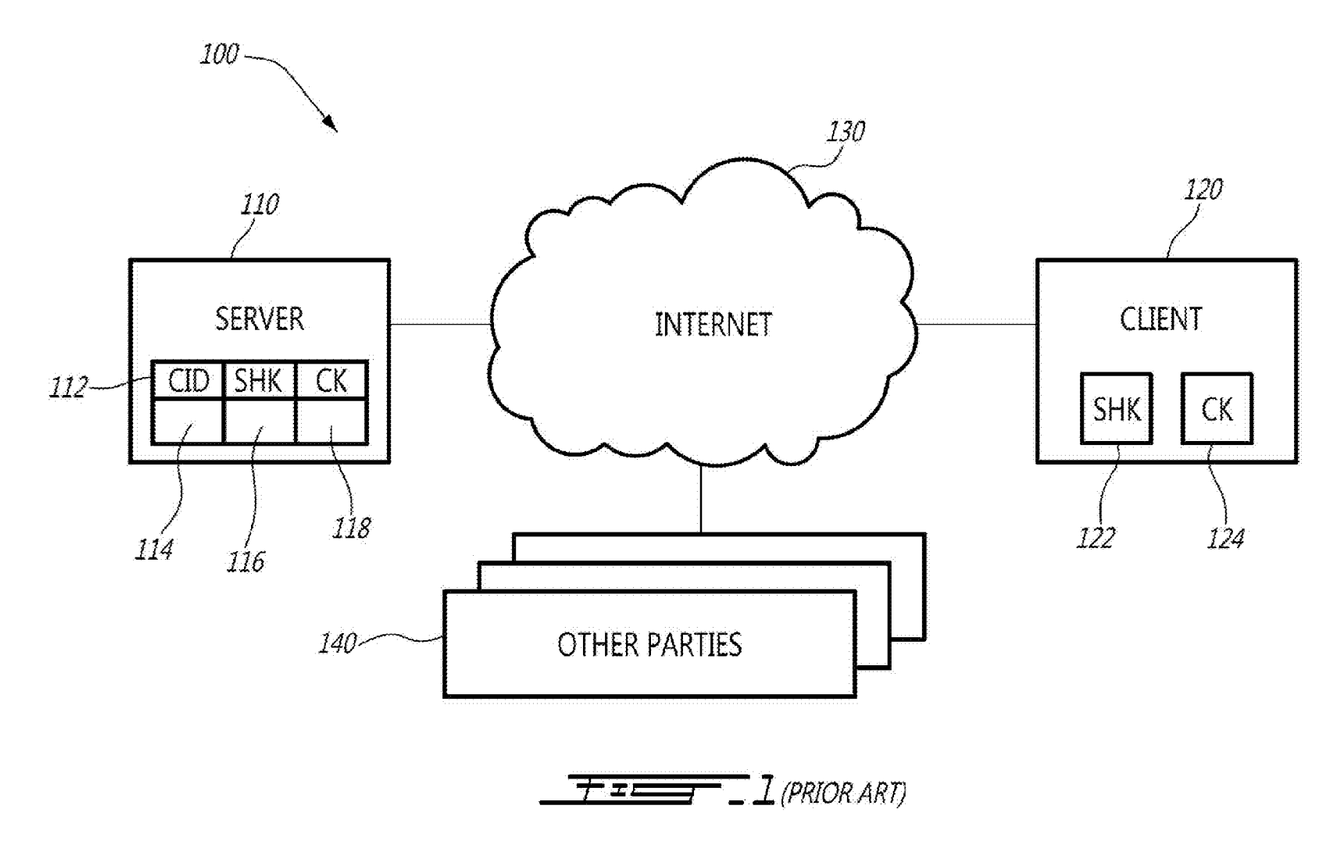
FIG. 1 (Prior Art) shows a typical server-client network.
Figure 2:
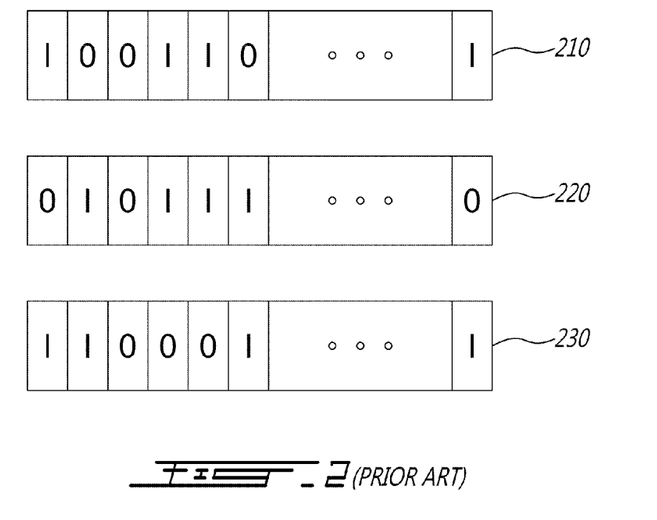
FIG. 2 (Prior Art) shows a manner of using an encryption key to encrypt a data packet.

FIG. 1 (Prior Art) shows a typical server-client network. The network 100 comprises a server 110, a client 120, the Internet 130 and other parties 140. Content exchanged between the server 100 and the client 120 travels through the Internet 130. As other parties 140 are also connected to the Internet 130, the content is encrypted between the server 110 and the client 120. The server 110 may serve a plurality of clients. The server 110 thus contains a table 112 further comprising, for each client, a client identity (CID) 114, an authentication key for the client, which may for example be a shared key (SHK) 116, and an content key (CK) 118. The client 120 also stores its own copies of the SHK 122 and of the CK 124. The CK 118 and 124, which are of equal value, are used to encrypt the information at a source (server or client) and to decrypt the information at a destination (client or server). FIG. 2 (Prior Art) shows a manner of using an encryption key to encrypt a data packet. The value of the keys CK 118 and 124 is represented as key 210. The key 210 is combined in an exclusive-OR (XOR) operation with the content of a data packet 220. This results in an encrypted packet 230. If a length of the keys CK 118 and 124 is not equal to a length of the data packet 220, a part of a longer key may be applied to a shorter data packet 220 or a shorter key may be applied successively to parts of a longer data packet 220. The encrypted packet 230 is sent from a source to a destination, where a further XOR operation of the encrypted packet 230 with the key 210 yields the original data packet 220.

Other parties 140 are not aware of the value of the CK 118 and 124 and are thus not capable to decrypt the information. The value of the CK 118 and 124 is generally generated in the server 110 and provided to the client 120. The SHK 116 is used to encrypt the CK 118 so that other parties 140 may not obtain the value of the CK 118. Manners of ensuring that the SHK 116 and 122 are protected against malicious eavesdroppers are well-known in the art. Of course, besides shared keys, other means are commonly used to ensure that encryption keys may be provided from a source to a destination; such means comprise for example the use of well-known public-private key pairs.

If a fixed value is used for the CK 118 and 124, other parties 140 may eventually be able to decode it. In such cases, the communication between the client 120 and the server 110 may become non-secure. This threat may be overcome by regenerating a new value of the encryption key CK 118 frequently and sending the new value to the client 120, the new CK 118 being also encrypted by use of the SHK 116. This process is called a rekey process. In a transmission error free network, the rekey process may be very effective. However, transmission errors may prevent the client 120 from receiving a rekey message. Transmission errors may occur for example in mobile wireless networks. They may occur in satellite TV networks, for example during a thundershower in the area of a satellite TV client. If the client 120 still has an old CK 124 value that no longer matches the CK 118 value, the client 120 becomes unable to decrypt received information and, as it encrypts information intended to be sent towards the server 110, it may use the old CK 124 value that is no longer recognized by the server 110. While it is possible for the client 120 to ask for a key renewal, this may only occur after the loss of the CK 124 value has been detected, adding delays to the proper decoding of the information and adding signaling overhead between the client 120 and the server 110.

SUMMARY

There would be clear advantages of having a method and nodes for providing legitimate users with encryption keys that can be regenerated when a client misses a rekey message.

It is therefore a broad object of this invention to provide a method and nodes for providing and receiving self-healing encryption keys.

A first aspect of the present invention is directed a method of providing self-healing encryption keys. The method starts with the definition in a server node of a self-healing period "p". The server node generates forward keys, wherein applying a first one-way function to a first forward key for an instant "i" ($FK_i$) generates a second forward key for a next instant "i+1" ($FK_{i+1}$). The server node also generates backward keys, wherein applying a second one-way function to a first backward key for an instant "i" ($BK_i$) generates a second backward key for a previous instant "i−1" ($BK_{i-1}$). The server node sends towards a client node the $FK_i$ and a backward key corresponding to an instant "i+p" ($BK_{i+p}$). The server node then receives from the client node feedback related to the self-healing period "p". The server node adjusts the self-healing period "p" based on the received feedback.

A second aspect of the present invention is directed to a method for receiving self-healing encryption keys. The method starts when a client node receives, from a server node, a forward key corresponding to an instant "i" ($FK_i$) and a backward key corresponding to an instant "i+p" ($BK_{i+p}$), wherein applying a first one-way function to the received $FK_i$ generates a next forward key for a next instant "i+1" ($FK_{i+1}$) and wherein "p" defines a self-healing period. The client node successively applies a second one-way function to the received $BK_{i+p}$ to obtain backward keys corresponding to each instant preceding the instant "i+p" until a backward key for the instant "i" ($BK_i$) is obtained. If the client node misses receiving form the server node a backward key corresponding to an instant that follows instant "i+p", it sends towards the server node feedback related to the self-healing period "p".

A third aspect of the present invention is directed to a server node for providing self-healing encryption keys. The server node comprises an interface that communicates with a client node. The server node also comprises a controller that controls the interface. The controller is also capable of defining a self-healing period "p". The controller generates forward keys, wherein applying a first one-way function to a first forward key for an instant "i" ($FK_i$) generates a second forward key for a next instant "i+1" ($FK_{i+1}$). The controller also generates backward keys, wherein applying a second one-way function to a first backward key for an instant "i" ($BK_i$) generates a second backward key for a previous instant "i−1" ($BK_{i-1}$). The controller sends towards the client node the $FK_i$ and a backward key corresponding to an instant "i+p" ($BK_{i+p}$). The controller also receives from the client node feedback related to the self-healing period "p". The controller adjusts the self-healing period "p" based on the received feedback.

A fourth aspect of the present invention is directed to a client node for receiving self-healing encryption keys. The client node comprises an interface that communicates with a server node. The client node also comprises a controller that controls the interface. The controller is also capable of receiving from the server node a forward key corresponding to an instant "i" ($FK_i$) and a backward key corresponding to an instant "i+p" ($BK_{i+p}$), wherein applying a first one-way function to the received $FK_i$ generates a next forward key for a next instant "i+1" ($FK_{i+1}$) and wherein "p" defines a self-healing period. The controller successively applies a second one-way function to the received $BK_{i+p}$ to obtain backward keys corresponding to each instant preceding the instant "i+p" until a backward key for the instant "i" ($BK_i$) is obtained. If the client node misses receiving form the server node a backward key corresponding to an instant that follows instant "i+p", the controller sends towards the server node feedback related to the self-healing period "p".

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

The present invention provides a method, a server node and a client node for providing and receiving self-healing encryption keys. An encryption key, valid for a given instant, is obtained by combining a forward key (FK) and a backward key (BK), which are both defined for the same instant. The FK is defined such that applying a one-way function to the FK for an instant provides a FK for a next instant, wherein a one-way function is defined as any mathematical function that can easily be computed in one direction, but cannot be easily computed in a reverse direction. The BK is defined such that applying the same or another one-way function to the BK for an instant provides a FK for a previous instant. As such, a node that knows the value of the FK for a given instant can compute, by use of the one-way function, FK values for an infinite number of following instants. In contrast, a node that knows the value of the BK for a given instant can compute, by use of the proper one-way function, BK values for an infinite number of previous instants. The server node prepares a first FK value for a first instant. It also prepares a BK value for a second, later instant, the second instant being separated by the first instant by a self-healing period. The server node provides the client node with the FK value for the first instant and the BK value for the second instant. The server node may optionally provide the client node with a value of the self-healing period. The client node applies the proper one-way function for the BK value for the second instant until it obtains BK value for the first (previous) instant. The client node can at that time calculate a desired encryption key for the first instant by use of the BK and FK for that first instant.

The server node sends a rekey message for every new instant following the first instant. For a given new instant, the rekey message comprises a BK value calculated based on that new instant and on the self-healing period. If the client node does not receive the new FK value, whether because of a transmission error or because it was not included in the rekey message, it applies the one-way function to a previously received or calculated FK value to calculate the missed FK value. If the client fails to receive the rekey message and if the rekey message is within a time range covered by the last received BK value, given the self-healing period, the client node has already calculated the BK value that is needed to calculate the encryption key at that time. If however the client node eventually finds itself incapable of calculating a needed BK value, because it missed several rekey messages for a time exceeding the self-healing period, it sends a rekey request message towards the server node. The server node may consider rekey request messages received from the client node as a feedback related to the self-healing period based, indicative of the fact that the client node is failing to receive a large number of rekey messages. Consequently, the server node may adjust the self-healing period based on the feedback. In contrast, if the server node receives few or no rekey request messages over a predetermined period of time, indicating that the client node easily receives rekey messages, the server node may shorten the self-healing period.

In the context of the present invention, the term "instant" may vary according to the type of application and/or to the nature of a communication path between the server node and the client node. In some embodiments, an instant may be stepped at regular time intervals, whether every few seconds, minutes, hours or days. In other embodiments, the instant may be stepped when a new event occur, being for example a new bank transaction, a new movie or a part thereof being delivered as a satellite TV content, a new report being added to a news content, a new player joining or a player leaving an online gaming session, and the like. In environments with frequent transmission errors, short instants along with longer self-healing periods may be used. Though not expressly recited throughout the disclosure of the present invention, those skilled in the art will recognize that rekey messages sent from a server node to a client node may themselves be encrypted by various means, including public-private key pairs, shared keys, and the like. Alternatively, a previous encryption key obtained using the self-healing keys of the present invention may be used to encrypt a rekey message.

The server node may comprise any type of server providing content and information to any type of client node, whether this server provides banking services, TV content, gaming, news, or any other type of information. The server node may alternatively be distinct from a content server and may be specifically tasked with providing encryption keys for use by a content server and its client. The client node may comprise a mobile cellular telephone, a mobile node, a digital personal assistant, a laptop computer, an IP television apparatus, a gaming device, another server such as a content server, and the like.

Figure 3:
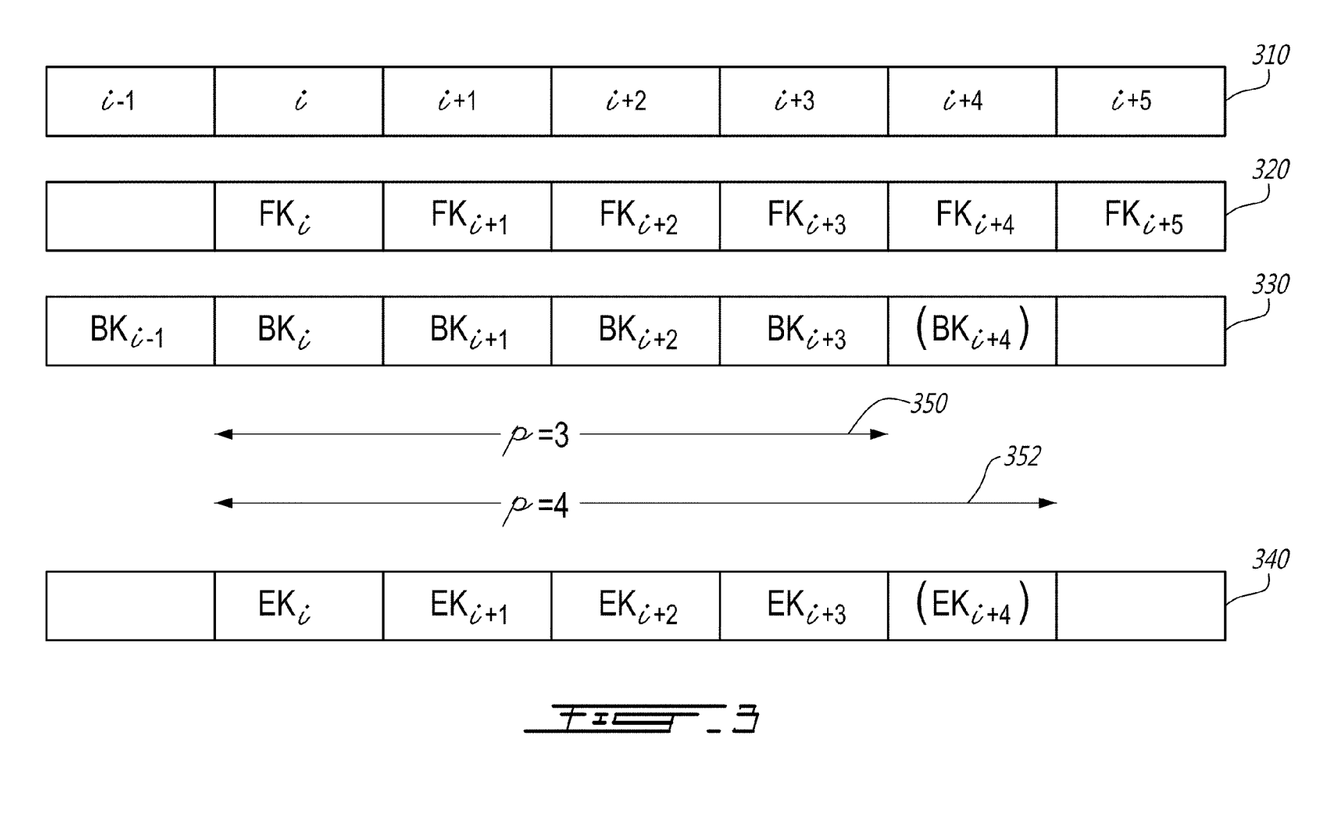
FIG. 3 shows an exemplary self-healing period of 3 or 4, as per some teachings of the present invention.

Reference is now made to the Drawings, in which FIG. 3 shows an exemplary self-healing period of 3 or 4, as per some teachings of the present invention. Row 310 on FIG. 3 shows successive instants. The other rows show suites of keys corresponding to the instants of row 310. Row 320 shows FK values, row 330 show BK values, and row 340 show encryption key (EK) values. Two distinct self-healing values "p" are shown: A first self-healing value 350 is set equal to 3 instants and a second self-healing value 352 is set equal to 4. A server node generates a suite of instants 310. At a given instant "i", the server node generates a forward key for that instant, $FK_i$. Whether or not they are calculated at the same time, next values in row 320 can be calculated by applying a one-way function, for example a one-way hashing, to $FK_i$. Hashing of $FK_i$ generates $FK_{i+1}$ and hashing of $FK_{i+1}$ generates $FK_{i+2}$, and so on. Within the same instant "i", the server node generates a backward key $BK_{i+p}$. If the self-healing period is 3, the generated backward key is $BK_{i+3}$. If the self-healing period is 4, the generated backward key is $BK_{i+4}$. Whether or not they are calculated at the same time, previous values in row 330 can be calculated by applying the same or another one-way function, for example a one-way hashing, to $BK_{i+p}$. Hashing of $BK_{i+4}$ generates $BK_{i+3}$ and hashing of $BK_{i+3}$ generates $FK_{i+2}$, and so on. Besides, hashing, other one-way functions that may be used in the context of the present invention comprise, for example a multiplication and factoring function, a modular squaring and square roots function, a discrete exponential and logarithm function, NP-complete problems such as the subset sum or the traveling salesman problems, or any other function that is hard to invert (decode). In some embodiments, the server node may initially generate a BK for a last instant in a given session, for example for midnight in a given day or for the last few seconds of a movie being delivered by satellite TV. Thereafter, the server node generates BK values for every instant preceding the last instant until a BK value for the beginning of the session is obtained.

EK values of row 340 are calculated at every instant by use of the FK and the BK for the same instant. In some embodiments, the EK is obtained by exclusive-OR (XOR) operation of the FK and the BK value. Until the next instant is reached, the EK value for an instant is used to encrypt at the source and to decrypt at the destination data packets exchanged between the server node and the client node.

Figure 4:
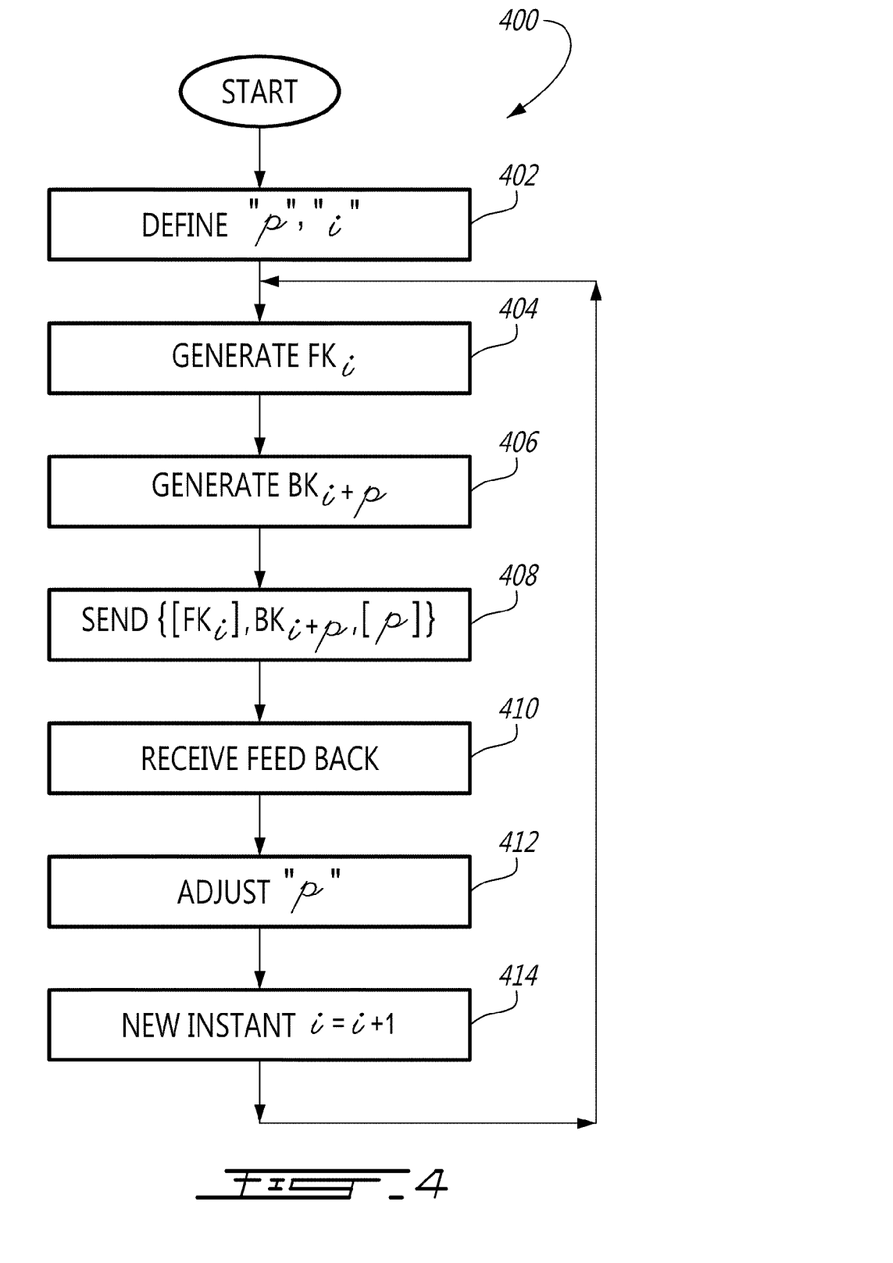
FIG. 4 shows a sequence diagram depicting exemplary steps of the method of the present invention.

FIG. 4 shows a sequence diagram depicting exemplary steps of the method of the present invention. A sequence 400 is performed in the server node of the present invention to generate self-healing keys, provide the self-healing keys to a client node, and adjust a self-healing period based on feedback obtained from the client node.

The method starts at step 402 when the server node defines a self-healing period "p". This may occur before or at an instant "i". At sep 404, the server node generates a FK for instant "i", $FK_i$. The $FK_i$ may be a randomly generated value if the sequence is for a new session. The $FK_i$ may be obtained from hashing a previous $FK_{i-1}$ value (or from applying another suitable one-way function thereto) if there is a desire to continue an ongoing session. At step 406, the server node generates a BK for instant "i+p", $BK_{i+p}$. If the server node desires to end the session after instant "i+p", or if the server node intends to restart a complete new self-healing key sequence after instant "i+p", the $BK_{i+p}$ may be randomly generated. If however the server node intends to continue the session with a same sequence for a longer period, generation of the $BK_{i+p}$ implies generating a BK for a later moment, for example corresponding to a predicted end of the session, and then generating a suite of BK values by hashing each BK value to obtain a previous BK value until the $BK_{i+p}$ value is obtained. At step 408, the server node sends towards a client node a rekey message comprising the $FK_i$, the $BK_{i+p}$, and optionally the value of the self-healing period "p". The rekey message itself may be encrypted using any type of key known by the server node and by the client node. At step 410, the server node receives feedback related to the self-healing period. Based on the received feedback, the server node may adjust the self-healing period "p" at step 412. For example, if the feedback is indicative of problems receiving one or more rekey messages, the server node may extend the self-healing period "p" to a larger value. In some embodiments, the server node may adjust the self-healing period "p" after a predetermined number of rekey messages has been received. At step 414, the server node determines that the time has come to step to a next instant "i=i+1". The sequence 400 continues at step 404 for the new instant "i". After the sequence 400 has been performed a first time, sending of the $FK_i$ in the rekey message of step 408 becomes optional because the client node is capable to calculating any next forward key based on previously received or calculated forward keys.

Figure 5A:
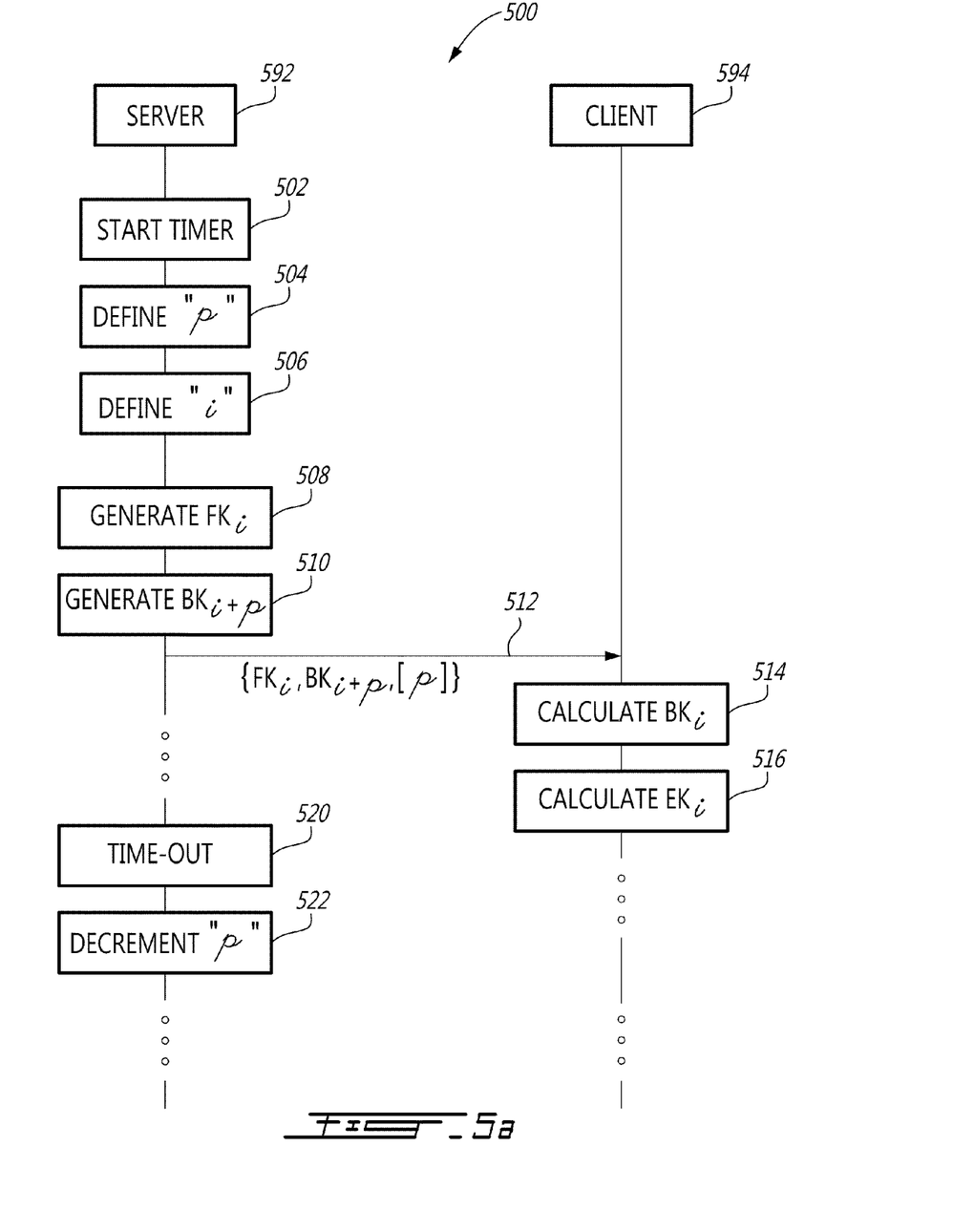
FIG. 5 shows an exemplary interworking sequence between a server node and a client node.
Figure 5B:
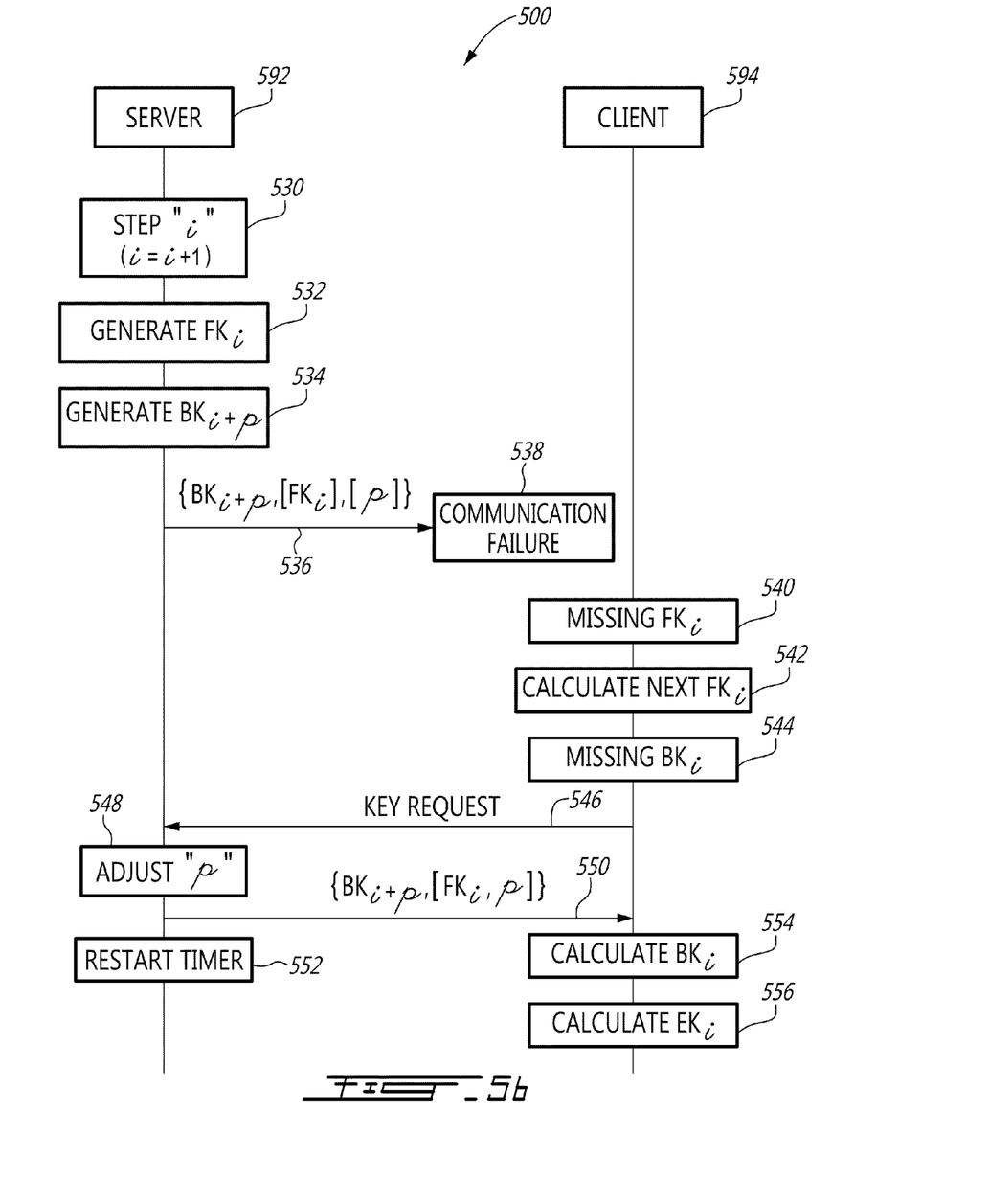

FIGS. 5a and 5b, collectively referred to as FIG. 5, show an exemplary interworking sequence between a server node and a client node. The interworking sequence 500 takes place between a server node 592 and a client node 594. Even though a server node 592 and a client node 594 are shown as directly coupled in FIG. 5, they may be indirectly coupled and separated geographically. The simplified coupling is shown in order to more clearly illustrate signaling exchanged between the server node 592 and the client node 594. The sequence starts at step 502 when the server node 592 starts a timer for use in managing the self-healing period "p". At step 504, which may actually occur before or after step 502, the server node 592 defines the self-healing period "p". At step 506, instant "i" is defined in the server node 592. As expressed hereinabove, instants may be time-based or event-based. At step 508, the server node 592 generates the FK for instant "i", $FK_i$, in the manner described in relation to step 404 of FIG. 4. At step 510, the server node generates the BK for instant "i+p", $BK_{i+p}$, in the manner described in relation to step 406 of FIG. 4. The server node 592 sends a rekey message comprising the $FK_i$, the $BK_{i+p}$, and optionally the value of the self-healing period "p" at step 512. The client node 594 receives the rekey message and calculates $BK_i$ value at step 514 by successively hashing the $BK_{i+p}$ "p" times. The client node 594 calculates an encryption key for instant "i" ($EK_i$) at step 516, for example by use of an XOR operation on the $FK_i$ and the $BK_i$. Following step 516, the client node 594 can encrypt and decrypt messages exchanged with the server node 592 by use of the $EK_i$.

If the value "p" was included at step 512, the client node 594 may use it at step 514 to calculate $BK_i$. If however the value "p" was not received from the server node 592, the client node 594 may hash the received $BK_{i+p}$ a first time to calculate a tentative BK. The client node 594 then calculates a tentative EK based on the $FK_i$ and on the tentative BK. The client node 594 applies the tentative EK in an attempt to decrypt any message received from the server node 592. If the message cannot be decrypted, the tentative BK may be hashed a second time for making a second attempt. The number of hashing processes required to obtain an EK capable of correctly decrypting the message received from the server node 592 provides the client node 594 with a correct value for the self-healing period "p". Thereafter, whenever the client node 594 receives a rekey message carrying a new $BK_{i+p}$, the client node 594 is capable of evaluating a current value for the self-healing period "p" by hashing the new $BK_{i+p}$ several times until a previously known $BK_i$ value is reached, the number of hashing steps providing an indication of a current value of "p". The indication is an upper bound of the current value of "p" because that value may have changed at the server node 592. A small amount of trial and error in calculating tentative BK and EK values may be necessary at the client node 594 to arrive at an actual value of "p".

After the interworking sequence steps 502-516 have taken place, various events may occur. For example, the timer intended for use in managing the self-healing period "p" that was started at step 502 may be expired at step 520. The time-out event of step 520 is normally indicative that the client node 594 has had no serious difficulty in receiving one or more rekey messages while the timer was active. Because communication between the server node 592 and the client node 594 is essentially problem free, the server node 592 may decrement the value of the self-healing period "p" to a lower value at step 522. This implies that future rekey messages will carry a BK covering a shorter period of time.

At some time following step 526, whether or not steps 520-522 have taken place, the server node 592 determines that it is time for a new rekey message. The server node 592 increments instant "i" to a new value "i=i+1" at step 530. The server node 592 generates, for the new instant "i", a new $FK_i$ at step 532. At step 534, the server node 592 generates a new $BK_{i+p}$, using a current value of the self-healing period "p". The server node 592 sends a new rekey message comprising the new $BK_{i+p}$ and optionally comprising the new $FK_i$ and the current value of "p" at step 536. However, a communication failure occurs between the server node 592 and the client node 594 at step 538. If the client node 594 is a mobile terminal, it may temporarily be located in a deep fade area, for example in an underground parking lot. If the client node 594 is a satellite TV receiver, it may be located in a region experiencing heavy thundershowers. At step 540, the client node 594 determines that it has missed the new $FK_i$ value because of the communication failure of step 538. The client node 594 simply calculates the new $FK_i$ value from a previously received or calculated value at step 542 (the client node 594 may also take this action when a properly received rekey message of step 536 does not comprise the new $FK_i$ value). At step 544, the client node 594 may determine that it misses a $BK_i$ value that is required at that time. Because of the self-healing period and of the capability present in the client node 594 to calculate backward keys that precede a received $BK_{i+p}$ value, step 544 only occurs when communication failures such as shown on step 538 have lasted for a period extending beyond the self-healing period "p", implying that the client node 594 missed more than "p" rekey messages. In those cases, the client node 594 sends a rekey request message to the server node 592 at step 546. Receiving the key request message at the server node 592 provides feedback indicative that the current self-healing period "p" is too short to overcome communication failures occurring between the server node 592 and the client node 594. Based on the feedback, the server node 592 may adjust the self-healing period "p" at step 548, for example to a longer value. In some embodiments, the server node 592 adjusts the self-healing period "p" when a predetermined number of rekey messages has been received. The server node 592 sends a rekey message to the client node 594 at step 550, the rekey message carrying a current $BK_{i+p}$ value and optionally comprising current $FK_i$, and "p" values. The server node 592 may restart the timer intended for use in managing the self-healing period "p" that was started at step 502, based on the fact that the client node 594 experienced repeated difficulties in receiving rekey messages while the timer was active.

Only one client node 594 is shown in FIG. 5. However, a typical server node may serve a plurality of clients. The server node 592 may define the self-healing period "p" for one or more clients. It may use the same self-healing period for all of its clients or may alternatively use various periods for various groups of clients. As an example, as weather conditions may impact satellite TV reception, a specific period may be assigned to a group of clients in a given geographical area because those clients may experience similar weather conditions at the same time. In turn, the server node 592 may adjust the self-healing period corresponding to a group of clients when it receives a number of key requests from a number of clients in the group.

Figure 6:
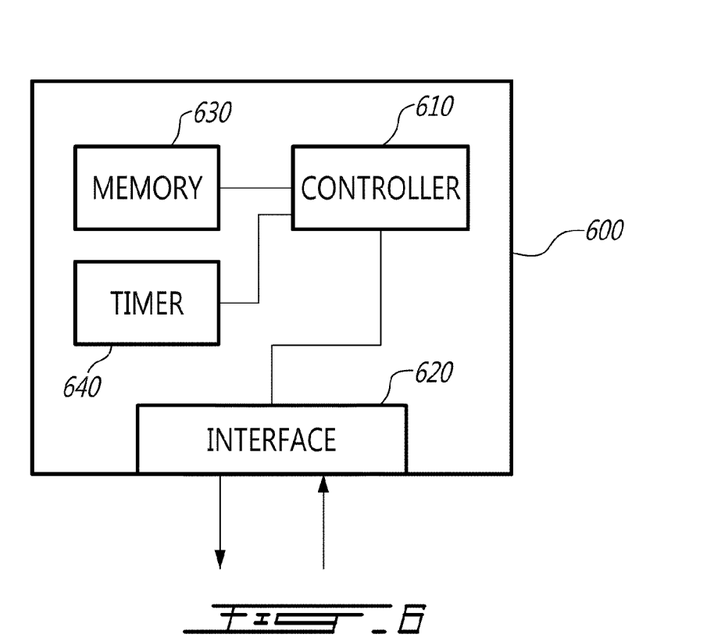
FIG. 6 shows an exemplary server node according to an aspect of the present invention.

An exemplary construction of a server node will now be described by reference to FIG. 6, which shows an exemplary server node according to an aspect of the present invention. The server node 600 comprises a controller 610, an interface 620 and may comprise a memory 630 and a timer 640. The controller 610 may be any commercially available, general purpose processor, or may be specifically designed for operation in the server node 600. The controller 610 may be operable to execute processes related to the present invention in addition to numerous other processes. The interface 620 may be implemented as one single device or as distinct devices for receiving and sending signaling, messages and data. The server node 600 is capable of being connected towards a plurality of client nodes; means for connecting the server node 600 towards client nodes may vary as, for example, connection towards one client node might be on an Ethernet link while connection towards another client node might be on an asynchronous transfer mode (ATM) link. Therefore the interface 620 may comprise a plurality of devices for connecting on a plurality of links of different types. Only one generic interface 620 is illustrated for ease of presentation of the present invention. The memory 630, if present, may be a volatile memory, or may alternatively be a non-volatile memory, or persistent memory, that can be electrically erased and reprogrammed and that may be implemented, for example, as a flash memory or as a data storage module. The timer 640, if present, may comprise any timing function capable of being reset by the controller 610 and of providing time-out information to the controller 610. The server node 600 may further comprise many more components such as for example banking applications, gaming applications, content databases, and the like, as is well-known in the art.

In the server node 600, the controller 610 controls the interface 620 and may read and write content in the memory 630. The controller 610 defines the self-healing period "p". The controller 610 then generates a suite of forward keys (FK) by applying a first one-way function to a first FK for an instant "i" ($FK_i$) to generate a second forward key for a next instant "i+1" ($FK_{i+1}$), sequentially applying the first one-way function to each newly generated FK to obtain a next FK. The controller also generates backward keys by applying the same first one-way function or a second one-way function to a suite of backward keys (BK). In contrast to the process of generating forward keys, applying the appropriate one-way function to a $BK_i$ generates a previous $BK_{i-1}$. In some embodiments, the controller 610 may generate a long sequence of backward keys, starting from a last BK corresponding to a last instant of a session to be held with a client, and thereafter use from the sequence any BK that is appropriate for the moment of use. The controller 610 may store the first FK and the last BK in the memory 630. If, for example following a reboot of the server node 600, the controller 610 loses track of current needed FK and BK values, the controller 610 may read the first FK and the last BK values from the memory 630 and apply the appropriate one-way functions as many time as required to recuperate the FK and BK values corresponding to the moment where the reboot is complete.

At an instant "i", the controller 610 sends towards the client node the $FK_i$, a backward key corresponding to an instant "i+p" ($BK_{i+p}$), and may send the value of "p". The controller 610 calculates an encryption key for use in exchanging content between the client node and the server node 600. An encryption key for instant "i" ($EK_i$) is calculated from the $FK_i$ and the $BK_i$, for example by applying a XOR function thereto. The controller 610 may receive from the client node feedback related to the self-healing period "p". The feedback may comprise a request from the client to resend key information. Responsive to the feedback, the controller 610 may adjust the self-healing period "p", for example by extending the period. The controller 610 normally acknowledges the received feedback by resending a rekey message carrying the requested key information towards the client node. Regardless of whether or not the self-healing period "p" has been adjusted, the controller 610 calculates a new $FK_i$ and a new $BK_{i+p}$ at every new instant "i". It then sends to the client node a rekey message carrying the new $BK_{i+p}$ and optionally carrying the new $FK_i$ along with a current value of "p". The controller 610 also calculates a new $EK_i$ for at every new instant "i".

In some embodiments, the server node 600 may serve a plurality of clients. The controller 620 may adjust the self-healing period "p" based on a number of received feedbacks, from one or from several of the plurality of clients. The controller 620 may alternatively define distinct self-healing periods, one such period being used for one client or for a group of clients. The controller 610 may also start the timer 640 when it generates a pair comprising the $FK_i$ the $BK_{i+p}$. The timer 640 is for use in managing the self-healing period and may thus have a time duration that is longer than the self-healing period. When the controller 610 extends the self-healing period based on received feedback, it may restart the timer 640. If the timer 640 provides a time-out indication to the controller 610, the controller 610 may reduce the self-healing period.

Figure 7:
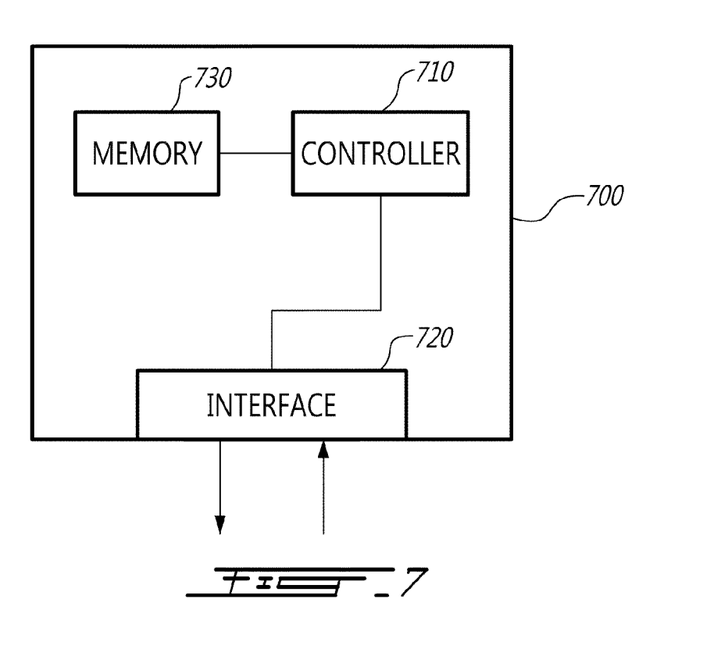
FIG. 7 shows an exemplary client node according to an aspect of the present invention.

An exemplary construction of a client node will now be described by reference to FIG. 7, which shows an exemplary client node according to an aspect of the present invention. The client node 700 comprises a controller 710, an interface 720 and may comprise a memory 730. The controller 710 may be any commercially available, general purpose processor, or may be specifically designed for operation in the client node 700. The controller 710 may be operable to execute processes related to the present invention in addition to numerous other processes. The interface 720 may be implemented as one single device or as distinct devices for receiving and sending signaling, messages and data. The client node 700 may be connected towards a plurality of server nodes; means for connecting the client node 700 towards server nodes may vary as, for example, connection towards one server node might be on an Ethernet link while connection towards another client node might be on an asynchronous transfer mode (ATM) link. The client node 700 may also be a wireless terminal that connects by use of a radio interface towards a radio network that further connects towards various server nodes. Therefore the interface 720 may comprise a plurality of devices for connecting on a plurality of links of different types. Only one generic interface 720 is illustrated for ease of presentation of the present invention. The memory 730, if present, may be a volatile memory, or may alternatively be a non-volatile memory, or persistent memory, that can be electrically erased and reprogrammed and that may be implemented, for example, as a flash memory or as a data storage module. The client node 700 may further comprise many more components such as for example end-user interfaces, browsers, video and audio displays, and the like, as is well-known in the art.

In the client node 700, the controller 710 controls the interface 720 and may read and write content in the memory 730. The controller 710 receives from a server node a forward key corresponding to an instant "i" ($FK_i$) and a backward key corresponding to an instant "i+p" ($BK_{i+p}$), wherein "p" defines a self-healing period. The value of "p" may also be received from the server node. If the controller 710 determines that client node has not received from the server node a forward key corresponding to any instant that follows an initial instant "i", the controller 710 applies a first one-way function to a last received or calculated forward key to calculate a next forward key. The controller 710 successively applies a second one-way function, which may be the same as the first one-way function, to the received $BK_{i+p}$ to obtain backward keys corresponding to each instant preceding the instant "i+p" until a backward key for the instant "i" ($BK_i$) is obtained. Thereafter, the controller 710 calculates an encryption key for use in exchanging content between the server node and the client node 700. An encryption key for instant "i" ($EK_i$) is calculated from the $FK_i$ and the $BK_i$, for example by applying a XOR function thereto.

The controller 710 determines whether or not the value "p" was received from the server node. If so, the controller 710 uses the received "p" to calculate the $BK_i$. If however the value "p" was not received from the server node, the controller 710 applies the appropriate one-way function to the received $BK_{i+p}$ a first time to calculate a tentative BK. It then calculates a tentative EK based on the $FK_i$ and on the tentative BK. The controller 710 then applies the tentative EK in an attempt to decrypt any message received from the server node. If the message cannot be decrypted, the controller applies the appropriate one-way function a second time to the tentative BK for making a second attempt. The number of times that the appropriate one-way function is applied to successive BK values to correctly decrypt the message provides the controller 710 with a correct value for the self-healing period "p".

If the controller 710 determines that client node has missed receiving form the server node a backward key corresponding to an instant that follows instant "i+p", the controller 710 sends towards the server node feedback related to the self-healing period "p". The feedback may take the form of a request to resend the missing backward key.

The controller 710 may store in the memory 730 the received $FK_i$ and $BK_{i+p}$ as well as calculated forward and backward keys. For example, if controller 710 fails to receive a $BK_i+2$, the self-healing period "p" being greater than 2, the controller 710 has previously calculated the missing $BK_i+2$ from the $BK_{i+p}$ when it calculated the $BK_i$ value. The controller 710 may retrieve the $BK_i+2$ if it is stored in the memory 730. Alternatively, that value may be calculated again from the $BK_{i+p}$, which may be preserved in the controller 710 until a new set of forward and backward keys are received from the server node.

Although several aspects of the preferred embodiment of the method and of the nodes of the present invention have been illustrated in the accompanying Drawings and described in the foregoing Detailed Description, it will be understood that the invention is not limited to the embodiments disclosed, but is capable of numerous rearrangements, modifications and substitutions without departing from the teachings of the invention as set forth and defined by the following claims.

The invention claimed is:

1. A method implemented in a server node for providing self-healing encryption keys, the method comprising the steps of:
   defining in the server node a self-healing period p;
   generating in the server node forward keys, wherein applying a first one-way function to a first forward key for an instant i ($FK_i$) generates a second forward key for a next instant i+1 ($FK_{i+1}$);
   generating in the server node backward keys, wherein applying a second one-way function to a first backward key for an instant i ($BK_i$) generates a second backward key for a previous instant i−1 ($BK_{i-1}$);
   sending from the server node towards a client node at instant i, the forward key at instant i ($FK_i$) and a backward key corresponding to an instant i+p ($BK_{i+p}$);
   sending from the server node towards the client node, at each new instant, after instant i, a new backward key (BKn+p);
   receiving at the server node from the client node feedback related to the self-healing period p based in the sending of the new backward key for each new instant after instant i; and
   adjusting at the server node the self-healing period p based on the received feedback.

2. The method of claim 1, wherein:
   receiving at the server node feedback related to the self-healing period p comprises receiving at the server node, from the client node, a request for a missing backward key.

3. The method of claim 2, wherein:
   adjusting at the server node the self-healing period p based on the received feedback comprises adjusting the self-healing period p based on a number of received requests for missing backward keys.

4. The method of claim 1, wherein:
   the server node sends towards the client node the self-healing period p together with the forward key at instant I ($FK_i$) and with the backward key corresponding to instant i+p ($BK_{i+p}$).

5. The method of claim 1 further comprising;
   initiating a time period in the server node; and
   at the end of the time period, decrementing the self-healing period p in the server node.

6. The method of claim 5, further comprising:
   re-initiating the time period in the server node upon receiving, from the client node, a key request asking for a missing backward key.

7. The method of claim 1, further comprising:
   sending from the server node towards the client node, at each new instant n, a current value of the self-healing period p.

8. The method of claim 1, wherein:
   the server node defines the self-healing period p for a plurality of client nodes; and
   adjusting at the server node the self-healing period p based on the received feedback comprises receiving feedback from one or more of the plurality of client nodes.

9. A method implemented in a client node for receiving self-healing encryption keys, the method comprising the steps of:
   receiving at the client node, from a server node, a forward key corresponding to an instant i ($FK_i$) and a backward key corresponding to an instant i+p ($BK_{i+p}$), wherein applying a first one-way function to the received $FK_i$ generates a next forward key for a next instant i+1 ($FK_{i+1}$) and wherein p defines a self-healing period;
   successively applying at the client node a second one-way function to the received $BK_{i+p}$ to obtain backward keys corresponding to each instant preceding the instant i+p until a backward key for the instant i ($BK_i$) is obtained;
   receiving at the client node, from the server node, at each new instant, after instant i, a new backward key (BKn+p); and
   if the client node misses receiving from the server node a new backward key (BKn+p) corresponding to an instant that follows instant i+p, sending from the client node towards the server node feedback related to the self-healing period p.

10. The method of claim 9, wherein:
    sending towards the server node the feedback related to the self-healing period p comprises sending towards the server node a key request asking for the missed backward key.

11. The method of claim 9, further comprising:
    calculating at the client node an encryption key for the instant i ($EK_i$) based on the $FK_i$ and on the $BK_i$.

12. The method of claim 11, further comprising:
    calculating at the client node forward keys for instants following the instant i; and
    calculating at the client node encryption keys for each instant from the instant i up to the instant i+p based on forward keys and backward keys for corresponding instants.

13. The method of claim 9, wherein:
    the client node receives from the server node the self-healing period p along with the $FK_i$ and the $BK_{i+p}$; and
    the client node uses the received self-healing period p to calculate the $BK_i$.

14. The method of claim 9, further comprising:
    successively applying at the client node the second one-way function to the received $BK_{i+p}$ to obtain tentative backward keys;
    calculating at the client node tentative encryption keys based on the $FK_i$ and on the tentative backward keys;
    attempting to decode a message received from the server node by use of the tentative encryption keys; and
    determining the self-healing period p based on successfully decoding the message received from the server node by use of a given tentative encryption key and based on a number of applications of the second one-way function required to obtain the given tentative encryption key.

15. A server node for providing self-healing encryption keys, comprising:
    an interface configured to communicate with a client node; and
    a controller to control the interface and configured to:
    define a self-healing period p;

generate forward keys, wherein applying a first one-way function to a first forward key for an instant i ($FK_i$) generates a second forward key for a next instant i+1 ($FK_{i+1}$);

generate backward keys, wherein applying a second one-way function to a first backward key for an instant i ($BK_i$) generates a second backward key for a previous instant i−1 ($BK_{i-1}$);

send towards the client node, at instant i, the forward key at instant i ($FK_i$) and a backward key corresponding to an instant i+p ($BK_{i+p}$);

send towards the client node, at each new instant, after instant i, a new backward key (BKn+p);

receive from the client node feedback related to the self-healing period p based on the sending of the new backward key for each new instant after instant i; and adjust the self-healing period p based on the received feedback.

16. The server node of claim 15, wherein:
the feedback received at the controller comprises a request for a missing backward key.

17. The server node of claim 16, wherein:
the controller further adjusts the self-healing period p based on a number of received requests for missing backward keys.

18. The server node of claim 15, wherein:
the controller further sends towards the client node the self-healing period p together with the forward key at instant i ($FK_i$) and with the backward key for the instant i+p ($BK_{i+p}$).

19. The server node of claim 15, wherein:
the controller is further configured to initiate a time period and to decrement the self-healing period p at the end of the time period.

20. The server node of claim 19, wherein:
the controller is further configured to re-initiate the time period upon receiving, from the client node, a request for a missing backward key.

21. A client node for receiving self-healing encryption keys, comprising:
an interface configured to communicate with a server node; and
a controller to control the interface and configured to:
receive from the server node a forward key corresponding to an instant i ($FK_i$) and a backward key corresponding to an instant i+p ($BK_{i+p}$), wherein applying a first one-way function to the received $FK_i$ generates a next forward key for a next instant i+1 ($FK_{i+1}$) and wherein p defines a self-healing period;

successively apply a second one-way function to the received $BK_{i+p}$ to obtain backward keys corresponding to each instant preceding the instant i+p until a backward key for the instant i ($BK_i$) is obtained;

receiving at the client node, from the server node, at each new instant, after instant i, a new backward key (BKn+p); and if the client node misses receiving from the server node a new backward key (BKn+p) corresponding to an instant that follows instant i+p, send towards the server node feedback related to the self-healing period p.

22. The client node of claim 21, wherein:
the controller is further adapted to send towards the server node the feedback related to the self-healing period p by sending towards the server node a key request asking for the missed backward key.

23. The client node of claim 21, wherein:
the controller is further adapted to calculate an encryption key for the instant i ($EK_i$) based on the $FK_i$ and on the $BK_i$.

24. The client node of claim 23, wherein:
the controller is further adapted to calculate encryption keys for each instant from the instant i up to the instant i+p based on forward keys and backward keys for corresponding instants.

* * * * *